(No Model.)
G. L. KINGSBURY.
GRIP FOR PORTABLE FIRE ESCAPES.
No. 556,099. Patented Mar. 10, 1896.
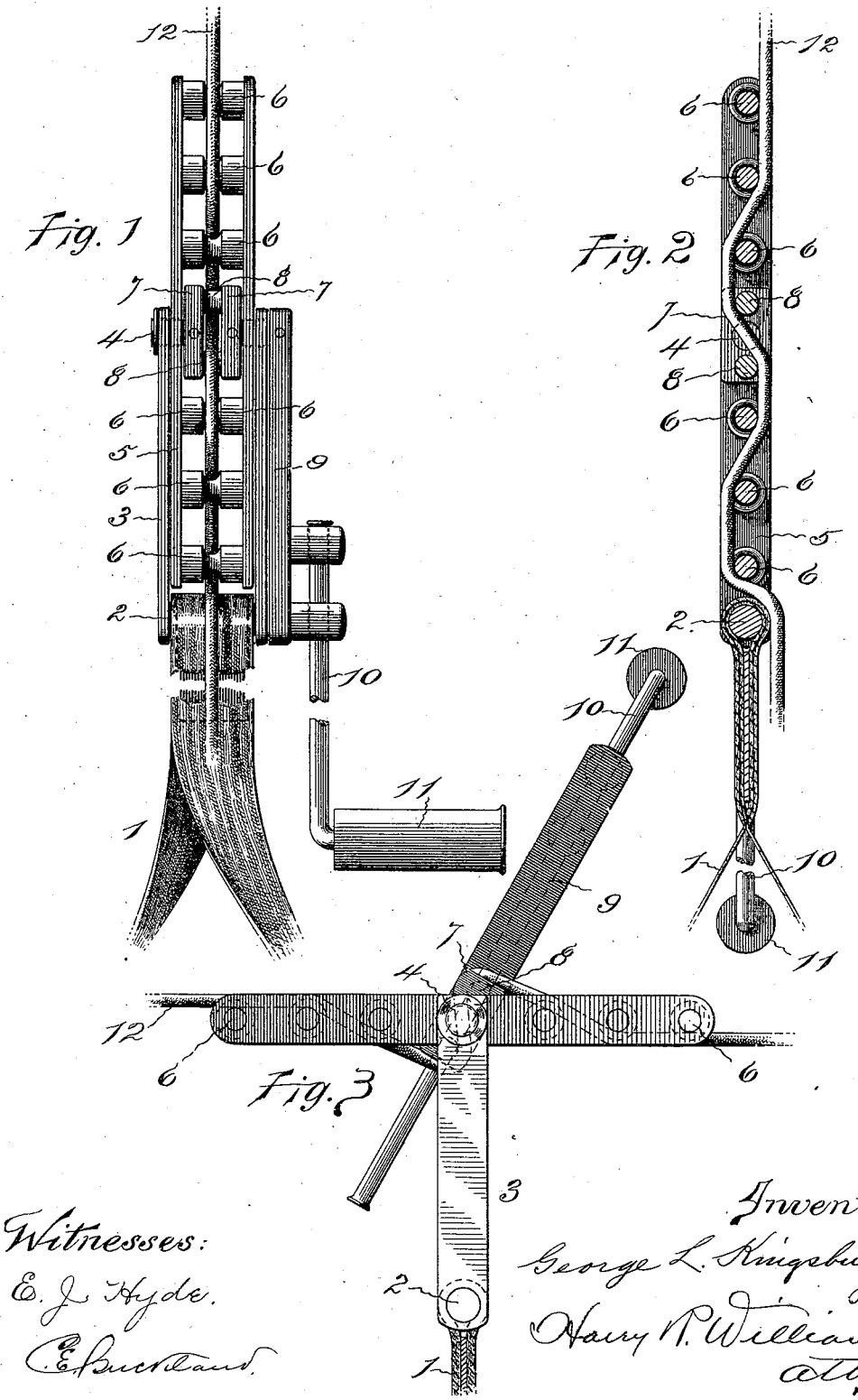

UNITED STATES PATENT OFFICE.

GEORGE L. KINGSBURY, OF ENFIELD, ASSIGNOR TO GEORGE L. KINGSBURY & CO., OF HARTFORD, CONNECTICUT.

GRIP FOR PORTABLE FIRE-ESCAPES.

SPECIFICATION forming part of Letters Patent No. 556,099, dated March 10, 1896.

Application filed October 14, 1895. Serial No. 565,563. (No model.)

*To all whom it may concern:*

Be it known that I, GEORGE L. KINGSBURY, a citizen of the United States, residing at Enfield, in the county of Hartford and State of Connecticut, have invented certain new and useful Improvements in Grips for Portable Fire-Escapes, of which the following is a specification.

The invention relates to the class of devices that are provided for connecting the individual-supporting part of a fire-escape with the rope or cord which the individual is to descend when escaping from a perilous position.

The object of the invention is to provide a grip for this purpose which is simple and cheap in construction and which can be readily operated by any one in such manner that the escape-cord may be gripped with any desired force, the tension of grip being susceptible to regulation so that the individual can descend rapidly, slowly, or stop descending at will.

Referring to the accompanying drawings, wherein the invention is illustrated, Figure 1 is a front elevation of the grip. Fig. 2 is a longitudinal section of the same, and Fig. 3 is a side view with the parts turned to more fully illustrate the construction and manner of use.

In the views, 1 indicates a loop which is adapted to be passed around the body of the individual desiring to use the escape. This loop may be formed of any desired length of cord, leather, or webbing of suitable strength, and the ends are passed around the outer rung or cross-bar 2 of the bail or yoke 3 and secured together so as to firmly attach the loop to this bail. The ends of the bail are perforated and hung on pivots 4, and on these same pivots are loosely supported the bars 5 that are connected together by the cross-rods 6. This cord-frame has any suitable number of cross-rods, and each rod is preferably at about midway between the side bars of the frame provided with a cord-groove.

Secured to the pivots 4 upon which the bail and the side bars of the cord-frame are pivoted is a cord-binding block. In the form shown this block consists of two side pieces 7 with cross-pieces 8 at each end of the side pieces, which cross-pieces are rounded so as to allow the cord to slip freely around them when desired. Of course this block could be made in one piece with a central opening instead of being made in four pieces, as shown. This block is secured tightly to the inner ends of the pivots 4, preferably by small pins, so as to rotate with them, and on the outer end of one of these pivots is tightly secured by pinning or otherwise the end of a crank-arm 9. When the crank-arm is rotated the pivots and the cord-binding block are also rotated without turning the bail or the cord-frame.

The crank-arm is preferably made extensible, and this is accomplished in the form shown by providing a pair of perforated lugs on the exterior near the end and loosely securing the rod 10 in these perforations. This rod is provided with a suitable handle 11. When the rod is drawn out, as it can be by simply pulling it through the perforations in the lugs on the side of the arm, the crank-arm is of sufficient length to enable considerable power to be applied for rotating the cord-binding block. When the rod is pushed in the device can be made to occupy but a small space for storing and for transportation.

The flexible cord 12, which may be common wire cable covered with any suitable material, down which the user of the escape is to slide in an emergency and which is to be grasped by the gripping device, so that the user will not travel with dangerous speed, is rove back and forth as much as desired between the different rungs or cross-rods 6 of the cord-frame. The cord preferably lies in the grooves in these rods so that it will travel in the center of the frame.

When the device is to be used, one end of the cord is secured to any suitable fixture or temporary support in the room or apartment which is occupied by the person desiring to use the device and the other end dropped from the window to the ground or other locality to which the user desires to descend. The user then sits in the loop, or, better, allows the loop to pass around his body until it encircles him just below the arms, and slips to the ground down the cord which is rove back and forth through the rungs or cross-rods of the cord-frame. When descending, one hand of the user may grasp the upper end of the supporting-loop, while the other hand grasps the handle of the extended crank-arm that rotates the cord-binding block. The crank then can be so rotated that the binding-block will cause a bight or kink in the cord which will completely stop descent or which may be of such a nature as to allow the user to descend with a speed of any desired rapidity. It can be readily seen that the speed of descent or slip of the cord-frame upon the cord will depend upon the bight of the cord as it passes through the cord-binding block, which, as shown, can be regulated to any desired degree by the rotation of the crank-handle.

After the device has been once used to allow a person to slide to the ground at a safe speed the cord can be drawn up, so that the grip can be used again. When the cord is thus drawn up the cord can be drawn through the cord-frame, so that the device will be ready to slide down again, or, if this is not desired, the cord-frame can be turned over on its pivots and what was the long free end of the cord can be connected with the support and the other end can be dropped from the window. When in this latter condition the device can be used exactly as before without taking the time or trouble to slip the grip along the entire length of the cord before taking the next descent.

The device is simple and cheap in construction. It is easily used by any one. It can be packed into a small space, so as to be convenient for transportation and occupy but little room when stored, and it can be used by persons of varying weight, who can regulate the speed of their descent at will without danger of burning their hands or injuring any portion of their flesh or bones when descending from a high and perilous position.

I claim as my invention—

1. A portable fire-escape consisting of a supporting-cord, a loop for supporting the individual, a cord-frame connected with the loop and having a series of openings from front to back with the supporting-cord rove therethrough, a rotatable binding-block with an opening from front to back and the supporting-cord passing therethrough, said block held by pivots to the frame, and a crank-arm secured to one of the pivots for rotating the pivots and the connected binding-block, substantially as specified.

2. A portable fire-escape consisting of a supporting-cord, a loop for supporting the individual, a bail attached to the loop, a cord-frame pivotally connected with the bail and having a series of openings from front to back with the supporting-cord rove therethrough, a rotatable binding-block with an opening from front to back and the supporting-cord passing therethrough, said block held by pivots to the frame, and a crank-arm secured to one of the pivots for rotating the pivots and the connected binding-block, substantially as specified.

3. A portable fire-escape consisting of a supporting-cord, a loop for supporting the individual, a bail attached to the loop, a cord-frame pivotally connected with the bail and having a series of openings from front to back with the supporting-cord rove therethrough, a rotatable binding-block with an opening from front to back and the supporting-cord passing therethrough, said block held by pivots to the frame, and an extensible crank-arm provided with a handle for rotating the block, substantially as specified.

GEORGE L. KINGSBURY.

Witnesses:
H. R. WILLIAMS,
E. J. HYDE.